United States Patent [19]
Stephenson et al.

[11] Patent Number: 6,049,545
[45] Date of Patent: Apr. 11, 2000

[54] SYSTEM AND METHOD FOR MESSAGE COMMUNICATIONS IN A DISTRIBUTED TELECOMMUNICATIONS SWITCH

[75] Inventors: R. Keith Stephenson, Coppell; Steve M. Pullen, Rowlett; David L. Hill; Alfred J. Blanchard, both of Plano, all of Tex.

[73] Assignee: Alcatel USA Sourcing, L.P., Plano, Tex.

[21] Appl. No.: 08/943,436

[22] Filed: Oct. 3, 1997

[51] Int. Cl.[7] .................................................. H04L 12/24
[52] U.S. Cl. ............................................. 370/410; 370/522
[58] Field of Search ..................................... 370/216, 225, 370/228, 386, 389, 395, 396, 400, 422, 423, 424, 429, 522, 410, 221, 222, 223, 257, 258, 438, 439, 440; 379/219, 220, 229, 230

[56] References Cited

U.S. PATENT DOCUMENTS

| | | | |
|---|---|---|---|
| 4,984,240 | 1/1991 | Keren-Zvi et al. | 371/8.2 |
| 5,084,816 | 1/1992 | Boese et al. | 370/522 |
| 5,151,896 | 9/1992 | Bowman et al. | 370/85.13 |
| 5,195,085 | 3/1993 | Bertsch et al. | 370/438 |
| 5,365,590 | 11/1994 | Brame | 380/49 |
| 5,479,395 | 12/1995 | Goodman et al. | 370/438 |
| 5,495,484 | 2/1996 | Self et al. | 370/110.1 |
| 5,642,350 | 6/1997 | Dailey | 370/439 |
| 5,664,010 | 9/1997 | Walker et al. | 379/207 |
| 5,673,265 | 9/1997 | Gupta et al. | 370/432 |

FOREIGN PATENT DOCUMENTS

| | | | |
|---|---|---|---|
| 9833301 | 7/1998 | WIPO | H04L 12/24 |

OTHER PUBLICATIONS

Maltini, et al. "OSI System and Application Management: an Experience in a Public Administration Context", pp. 492–500, Apr. 15, 1996, IEEE.

*Primary Examiner*—Ricky Ngo
*Attorney, Agent, or Firm*—Baker Botts L.L.P.

[57] ABSTRACT

A communications system in a distributed telecommunications switch having a service unit and at least one delivery unit is provided. The system includes a plurality of network controllers residing in the at least one delivery unit, and at least two network controllers residing in the service unit. An administration network is coupled to a first one of the plurality of delivery unit network controllers and to a first one of the two service unit network controllers. The administration network transporting messages having administration information between the service unit and delivery unit. A call processing network is coupled to the remaining of the plurality of delivery unit network controllers and to the second one of the two service unit network controllers. The call processing network transporting messages having call processing information between the service unit and delivery unit.

26 Claims, 6 Drawing Sheets

SYSTEM AND METHOD FOR MESSAGE COMMUNICATIONS IN A DISTRIBUTED TELECOMMUNICATIONS SWITCH

RELATED PATENTS AND PATENT APPLICATIONS

This patent application is related to U.S. Pat. No. 5,495,484, titled Distributed Telecommunications Switching System, issued to Self et al. on Feb. 27, 1996 ("Self"), incorporated herein by reference.

TECHNICAL FIELD OF THE INVENTION

This invention is related in general to the field of telecommunications systems. More particularly, the invention is related to a system and method for message communications in a distributed telecommunications switch.

BACKGROUND OF THE INVENTION

In a distributed system, the task of managing the communications between the processes is of utmost importance. In a distributed system such as a distributed telecommunications switch described in Self, processes may reside in the service unit and one or more delivery units coupled to the service unit. Because fault tolerance is an important requirement in a telecommunications switch, means must also be provided to support messaging redundancy.

SUMMARY OF THE INVENTION

Accordingly, there is a need for a system and method for message communications in a distributed telecommunications switch which eliminate or substantially reduce the disadvantages associated with prior communications schemes.

In one aspect of the invention, a communications system in a distributed telecommunications switch having a service unit and at least one delivery unit is provided. The system includes a plurality of network controllers residing in the at least one delivery unit, and at least two network controllers residing in the service unit. An administration network is coupled to a first one of the plurality of delivery unit network controllers and to a first one of the two service unit network controllers. The administration network transporting messages having administration information between the service unit and delivery unit. A call processing network is coupled to the remaining of the plurality of delivery unit network controllers and to the second one of the two service unit network controllers. The call processing network transporting messages having call processing information between the service unit and delivery unit.

In another aspect of the invention, a method for communications in a distributed telecommunications switch having a service unit and at least one delivery unit is provided. The method includes the steps of registering a first delivery unit application residing on a first delivery unit with a first message handler, and registering a service unit application residing on the service unit with a service element. Messages sent to the service unit application are built with an identification of the service unit application as the destination. The message includes a message header. The message is sent to the message handler, which sends the message over a network and a redundant segment thereof to the service unit. A service element at the service unit receives the message and sends the message to the service unit application.

BRIEF DESCRIPTION OF THE DRAWINGS

For a better understanding of the present invention, reference may be made to the accompanying drawings, in which.

DETAILED DESCRIPTION OF THE INVENTION

The preferred embodiments of the present invention are illustrated in FIGS. 1–8, like reference numerals being used to refer to like and corresponding parts of the various drawings.

Figure 1:
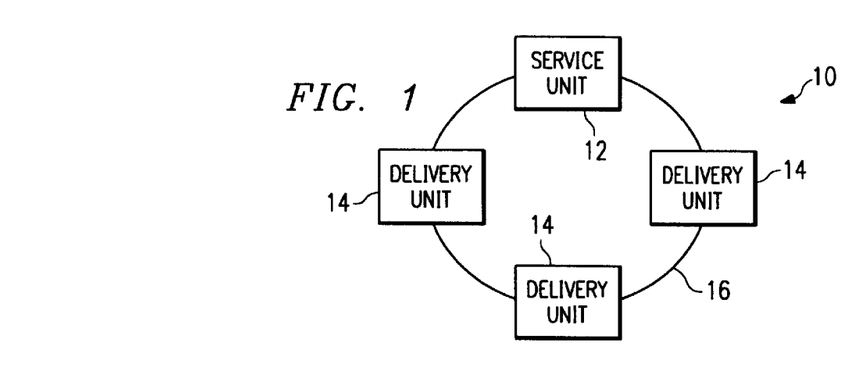
FIG. 1 is a simplified block diagram of a distributed telecommunications switching system.

FIG. 1 is a simplified block diagram of a distributed telecommunications switching system 10. Distributed telecommunications switching system 10 includes a service unit 12 that provides control and management on an advanced intelligent network (AIN) service platform using information network architecture (INA) software design principles. Distributed telecommunications switching system 10 also includes a plurality of delivery units 14 coupled to service unit 12 that provide the message transport mechanism for call information under the control and management of service unit 12. Service unit 12 and delivery units 14 may communicate with one another through a fiber optic-based or electrical-based network ring 16. For details on distributed telecommunications switching system 10, please refer to U.S. Pat. No. 5,495,484, titled Distributed Telecommunications Switching System, issued to Self et al. on Feb. 27, 1996, incorporated herein by reference.

Figure 2A:
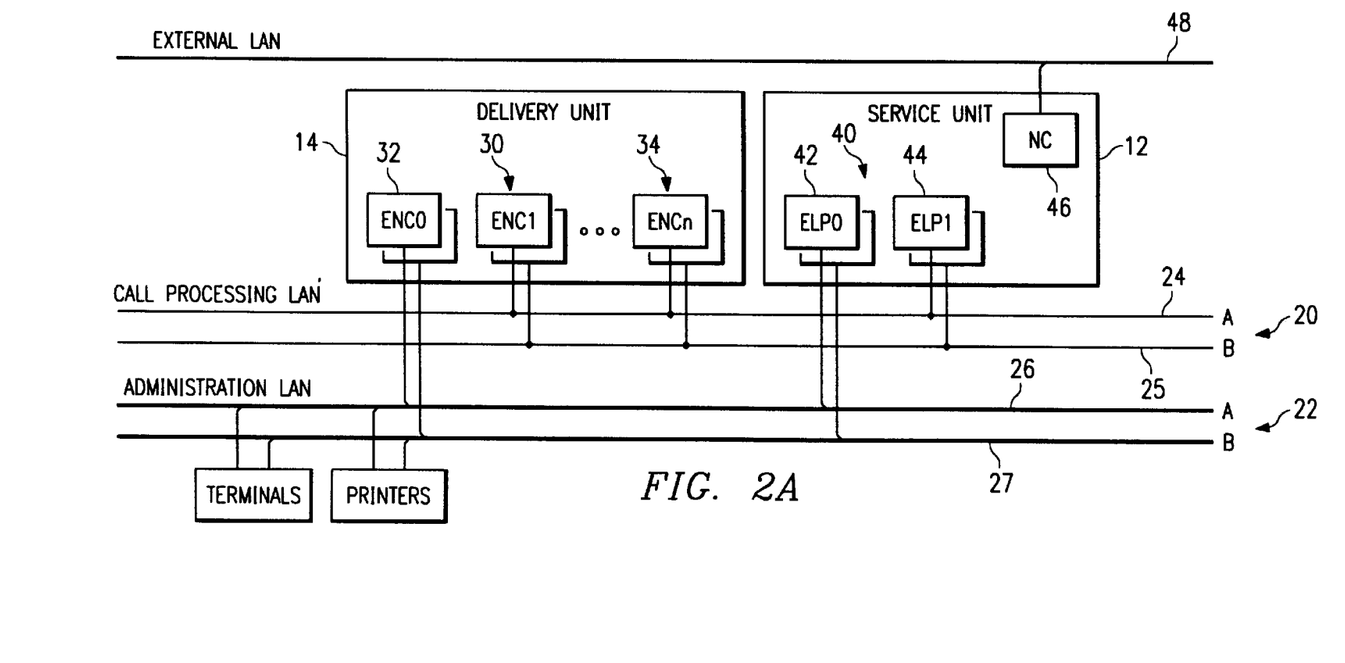
FIG. 2A is a block diagram of the communications pipelines between the service unit and delivery units of the distributed telecommunications switching system according to an embodiment of the present invention.

FIG. 2A is a block diagram of the network topology of service unit 12 and an exemplary delivery unit 14. Service unit 12 and delivery unit 14 are coupled to one another via two networks, a call processing local area network (LAN) 20 and an administration local area network 22. Call processing local area network 20 includes redundant segments, an A segment 24 and a B segment 25. Similarly, administration local area network 22 includes redundant segments, an A segment 26 and a B segment 27. Call processing and administration networks 20 and 22 may be implemented by ethernet segments utilizing the UDP/IP protocol (user datagram protocol/internet protocol). Delivery unit 14 includes a minimum of two ethernet controller (ENC) pairs 30 for interfacing with call processing and administration networks 20 and 22. One ethernet controller pair 32, ENC0,is coupled to administration network 22 and dedicated to transmitting administration messages related to network management. Additional one or more pairs of ethernet controller pairs 34, ENC1 to ENCn, are coupled to call processing network 20 and dedicated to transmitting call processing messages. The number of call processing ethernet controller pairs is determined by bandwidth requirements of the system.

Service unit 12 includes at least two ethernet link processor pairs (ELPS) 40, ELP0 42 and ELP1 44. One ethernet link processor pair 44 is coupled to call processing network 20 and is dedicated to transmitting call processing messages and the other ethernet link processor pair 42 is coupled to administration network 22 and is dedicated to transmitting administration/network management messages. Administration/network management messages transported on administration network 22 may include messages related to event reporting (alarms, information problem reports, etc.), traffic metering and measurement, and database updates. Hereinafter, the term "network controller" may be a generic term used to refer to both the ethernet link processors and ethernet controllers, or a similar controller for a network.

In this configuration, ethernet link processors utilize both corresponding network segments. In the event of an ethernet link processor failure or cable failure, messages are transported on the alternate network segment. All ethernet link processors are capable of sending and receiving messages.

Service unit 12 may further include an additional network controller (NC) 46, which may include an SCSI (small computer systems interface) controller, ethernet controller, and other hardware such as disk drives. Network controller 46 is coupled to an external local area network 48, which is used to communicate information to/from systems and components outside of distributed telecommunications switch 10.

Figure 2B:
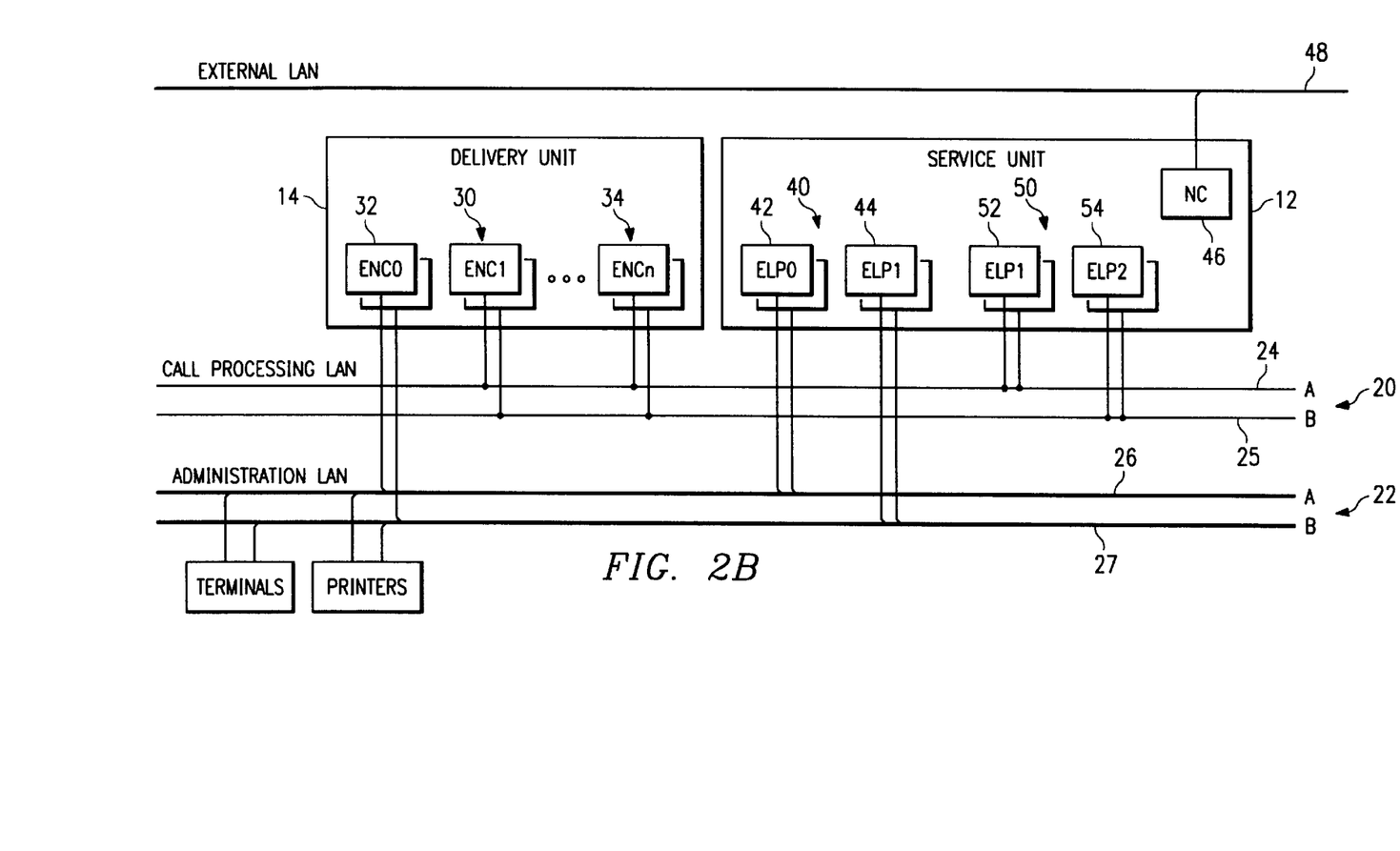
FIG. 2B is a block diagram of an alternative arrangement of the communications pipelines between the service unit and delivery units of the distributed telecommunications switching system according to an embodiment of the present invention.

FIG. 2B is a block diagram of an alternative embodiment of the service unit/delivery unit network topology. In this embodiment, service unit 12 includes additional pairs of ethernet link processors 50 to achieve added measures of fault tolerance. Both copies of ethernet link processor pair 42 are now coupled to A segment 26of administration local area network 22, and both copies of ethernet link processor pair 44 are now coupled to B segment 27 of administration local area network 22. Additional pairs of ethernet link processor pairs 52 and 54 are coupled to A segment 24 and B segment 25 of call processing local area network 20, respectively.

Constructed in this manner, an ethernet link processor failure or a network segment failure may be detected and message transmission may be switched over to the functioning ethernet link processor or network segment.

Figure 3:
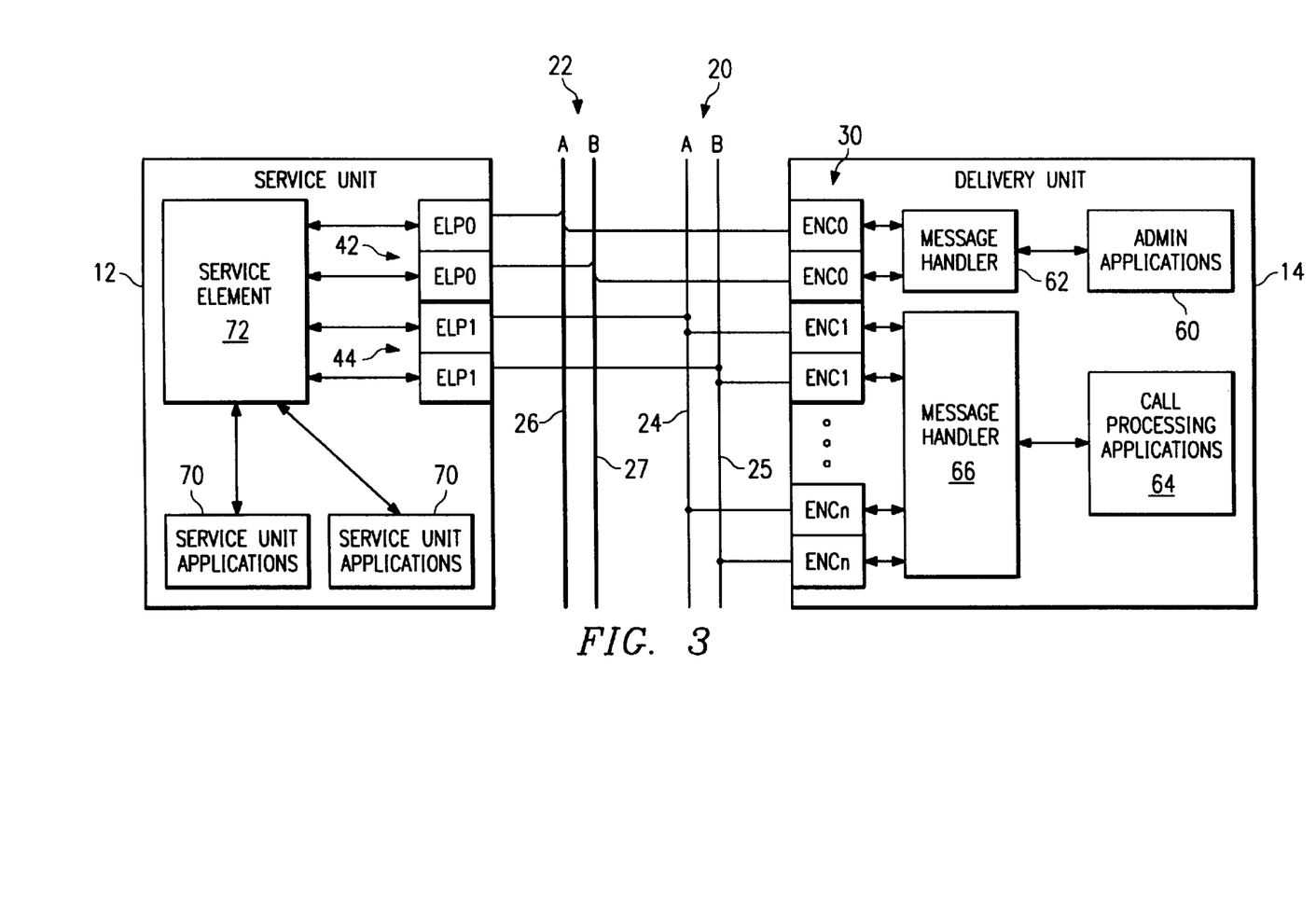
FIG. 3 is a simplified block diagram of the interface between service unit and delivery unit applications according to an embodiment of the present invention.

FIG. 3 is a simplified block diagram of the interface between applications on delivery unit 14 and applications on service unit 12. Administration applications 60 interface with a message handler 62, which communicates with ethernet controllers 30. Similarly, call processing applications 64 interface with the same or a different SU-DU message handler 66, which also communicates with ethernet controllers 30. Each message handler 60 and 62 can interface with both administration and call processing local area network segments for sending and receiving messages thereon. Service unit applications 70 interface with a service element 72, which communicates with ethernet link processor pairs 42 and 44.

Figure 4:
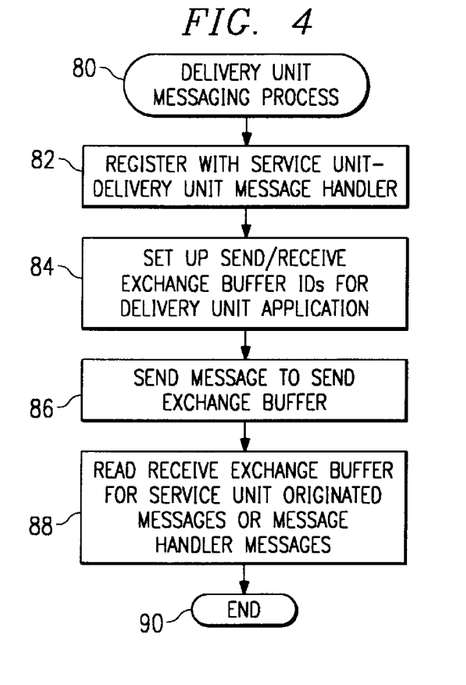
FIG. 4 is a flowchart of an exemplary delivery unit messaging process according to the teachings of the present invention.

FIG. 4 is a simplified flowchart of an exemplary delivery unit messaging process 80. Before a delivery unit application may communicate with a service unit application, it must first be registered with its message handler. If there are separate message handlers 62 and 66 for interfacing with administration and call processing local area networks 22 and 20, respectively, then administration applications 60 register with message handler 62 and call processing applications 64 register with message handler 66. At registration shown in step 82, the delivery unit application may specify that it desires to send and/or receive messages from service unit 12, and further specify throttling and/or pipeline functionality. Details of the registration process is described below as referring to FIG. 5. As part of the registration process, send and receive exchange buffers are set up and their identifiers are provided to the delivery unit application, as shown in step 84. Thereafter, the delivery unit application may send messages to service unit application(s) by communicating the messages to the send exchange buffer of the message handler, and also receive messages from the service unit by reading the receive exchange buffer. This is shown in steps 86 and 88. The delivery unit messaging process terminates in step 90.

Figure 5:
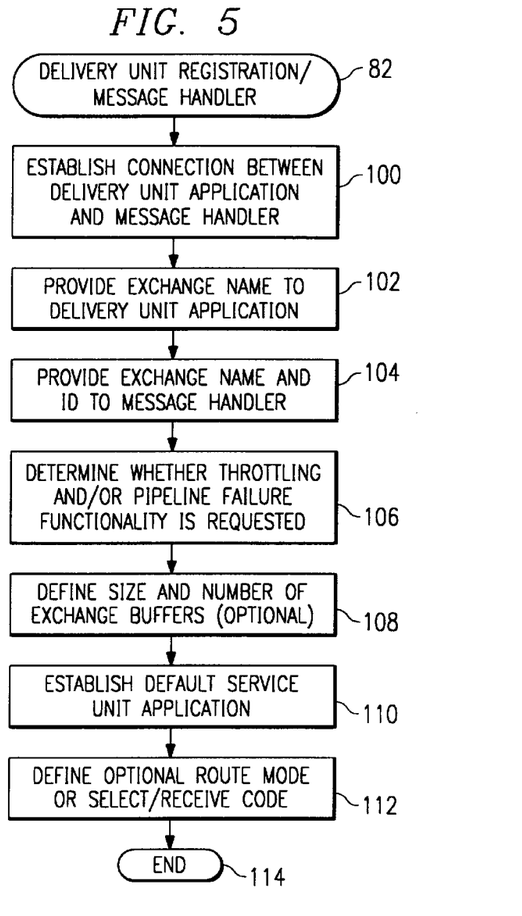
FIG. 5 is a flowchart of an exemplary delivery unit registration process as seen from the view point of the message handler according to the teachings of the present invention.

FIG. 5 is a more detailed flowchart of delivery unit application registration process 82 as seen from the message handler. In step 100, a connection is established between the delivery unit application and the message handler. In step 102, an exchange name for sending messages to the service unit is provided to the delivery unit application. An exchange name and identifier for a service unit application are then provided to the message handler in step 104. In step 106, if throttling and/or pipeline failure functions are requested by the delivery unit, an exchange name and identifier for forwarding throttling and pipeline failure messages to the delivery unit application are also provided to the message handler. In step 108, the size and number of exchange buffers for exchanging messages between the delivery unit application and message handler are optionally defined.

If the throttling function is initialized for the delivery unit application, a high water mark and a low water mark are defined for the send exchange for the delivery unit application. Typically, the high water mark or maximum set point is set at approximately 80% of the number of buffers defined on the sending exchange, and the low water mark or minimum set point is set at approximately 20% of the number of buffers defined on the sending exchange. When an outgoing message task reads the sending exchange, an error code for high water mark reached would be returned if the number of allocated buffers reached the predefined high water mark. Message handler then sends an initiate throttling message to the delivery unit application. The delivery unit application may then stop sending messages to the service unit until it receives a start sending messages again message from the message handler, which indicates that the number of buffers is below the high water mark.

If the delivery unit application requested the pipeline status functionality, it is informed when a service unit application is not accessible across the pipeline. Depending on the system configuration, the pipeline to a specific service unit is defined as the path from the delivery unit application to a service unit application across the total number of multiple ethernet controllers that are configured on a specific administration or call processing local area network. A pipeline failure would indicate that all paths to the service unit application via all associated ethernet controllers are unavailable. When the message handler detects a pipeline failure associated with a service unit application, it checks to determine what delivery unit applications requested to be informed of this fact. A pipeline status message containing a identification of the unreachable service unit application is then sent to each delivery unit. The delivery unit applications then may stop sending messages to the service unit application. When the service unit application becomes accessible, another pipeline status message is sent to the delivery unit applications.

Returning to FIG. 5, in step 110, a delivery unit application may specify one or more default service unit applications that it may communicate with. Further, the delivery unit application may define any optional route mode or select/receive code the message handler should use on incoming messages to the delivery unit application. The registration process ends in step 114. It may be noted that the steps shown in FIG. 5 do not necessarily have to be performed in the sequence shown and described above, and that FIG. 5 merely represents an exemplary flow for delivery unit application registration.

To initiate the registration process with the message handler, the delivery unit application sends a predefined message header along with a registration message to the message handler. As described above, the registration message may include indications of whether throttling and/or pipeline status functionality is desired; the number of buffers; and throttling high water mark and low water mark. A registration acknowledgment message is then sent back to the delivery unit application on the delivery unit application's sending exchange. The registration acknowledge message may include a successful registration code. If the delivery unit application was a resident program which is always running, and the delivery unit application requested send capabilities to the service unit, then an ASCII exchange name is returned in the registration acknowledgment messages. This exchange name is used by the resident delivery unit applications to send messages to the service unit.

Figure 6:
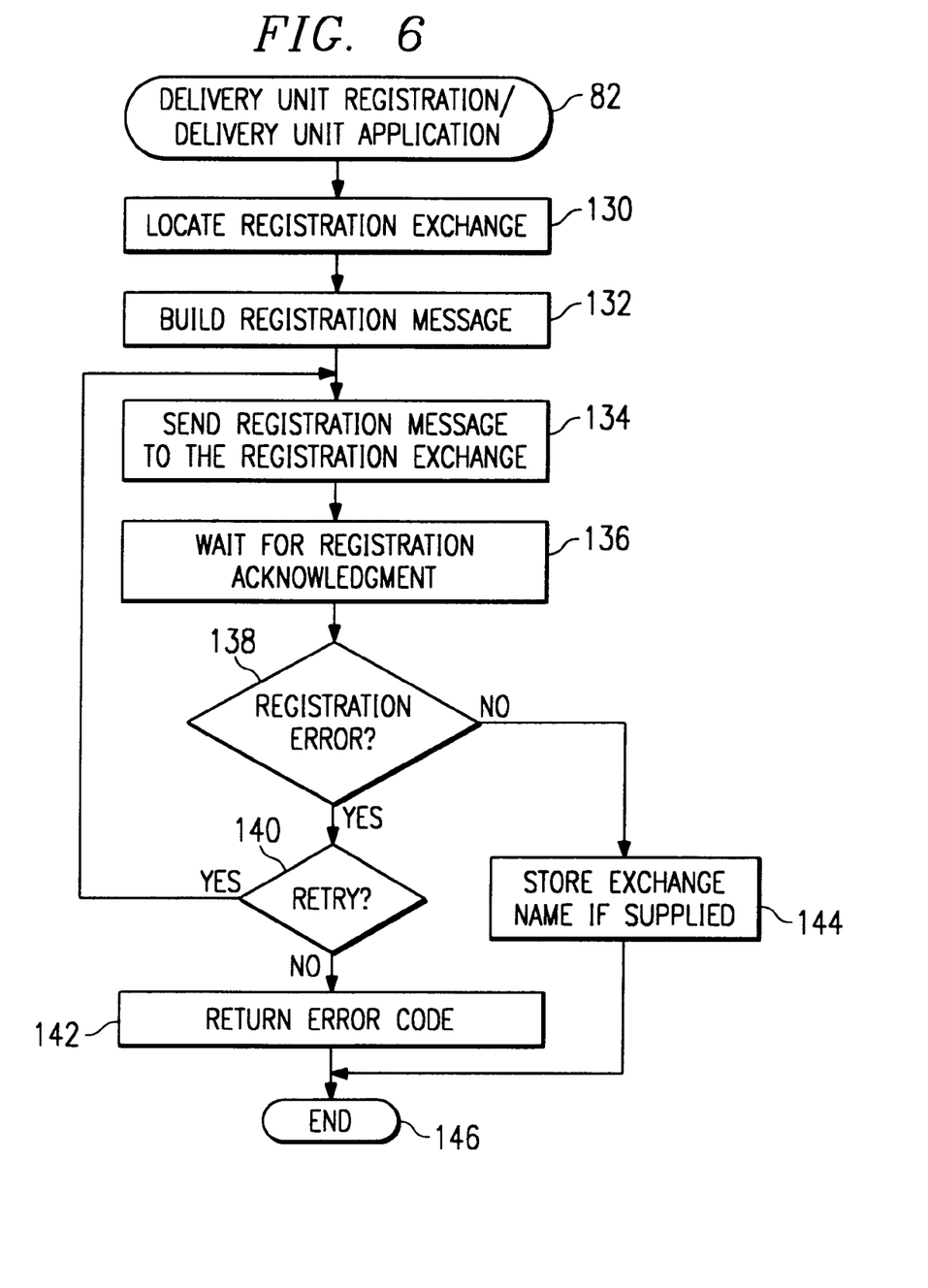
FIG. 6 is a flowchart of an exemplary delivery unit registration process as seen from the view point of the delivery unit application according to the teachings of the present invention.

FIG. 6 is a flowchart of an exemplary registration process 82 as seen from the delivery unit application. The delivery unit application first locates or identifies the registration exchange which handles delivery unit application registration, as in step 130. The delivery unit application then builds a registration message, which includes an SU-DU message header in step 132. The message header includes information such as the service unit device identifier, service unit process type, service unit process identifier, delivery unit identifier, delivery unit process type, delivery unit process identifier, type of message, ethernet controller identifier, registration time stamp (for interface with devices outside of distributed switching system), and registration flag indicative of registration message or non-registration message. In step 134, the registration message is sent to the registration exchange. Thereafter, the delivery unit application waits for the registration acknowledgment message from the message handler, in step 136. The message header in the registration acknowledgment message contains a registration acknowledgment code that indicates whether registration was successful. If the registration acknowledgment code indicates that registration was unsuccessful in step 138, then delivery unit application may try again to register by returning to steps 132 (if it is believed that the registration message was incorrectly built) or 134. If the delivery unit application does not desire to retry registration, then an error code may be returned, and no further attempt is made at this time.

If the registration was successful, as determined in step 138, then in step 144 the CEKOS exchange name is stored in a destination exchange macro, for example, if the resident delivery unit application requested the capability to send messages to the service unit. The process terminates in step 146.

Delivery unit applications may also de-register with the message handler to free up any resources allocated to them. To do this, the delivery unit application also builds and sends a registration message with a message header with a de-registration request therein.

To send a message from the delivery unit application to a service unit application, the delivery unit applications simply constructs a message with the message header, and sends it to the message handler. The delivery unit application may use the exchange name it received at the time of registration. The message handler may request the delivery unit application to re-register if it has misplaced the registration information for the delivery unit application or if the delivery unit application was not registered to send messages to the service unit.

Figure 7:
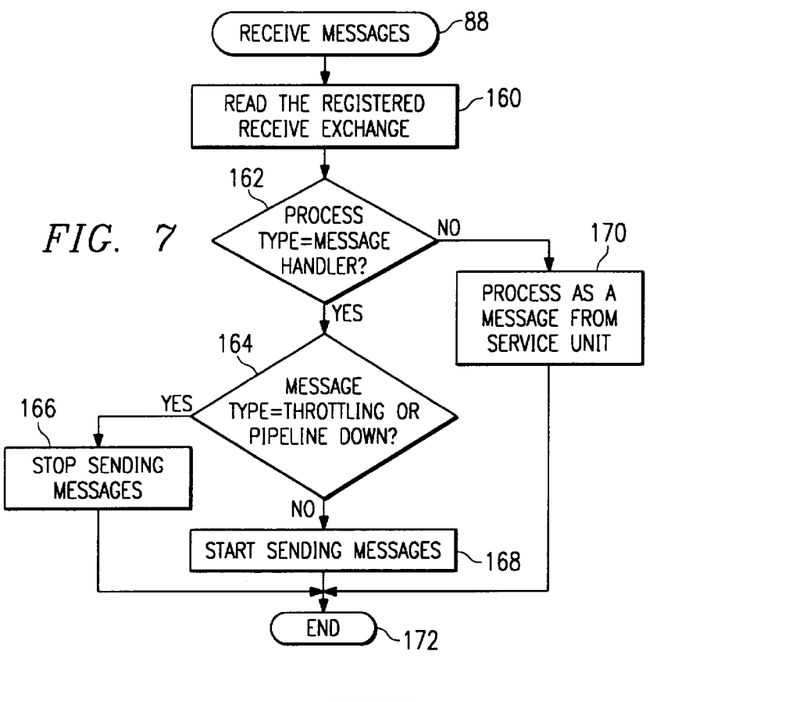
FIG. 7 is a flowchart of an exemplary message receiving process according to the teachings of the present invention.
Figure 8:
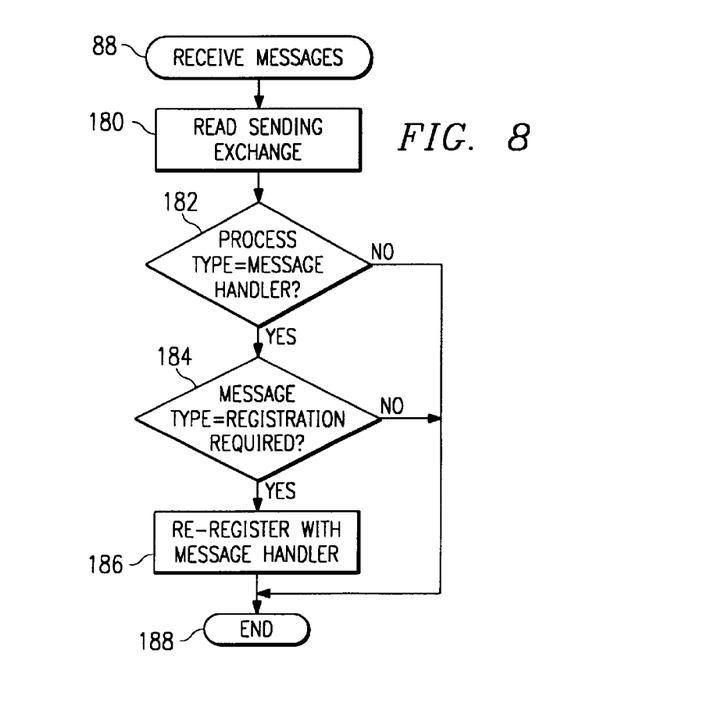
FIG. 8 is a flowchart of another exemplary message receiving process according to the teachings of the present invention.

FIGS. 7 and 8 are flowcharts of exemplary processes of a delivery unit application receiving messages 88. The delivery unit application may receive service unit application messages and message handler informational messages. Service unit application messages may include both messages from the service unit and also throttling and pipeline status messages. Both service unit application messages and message handler informational messages may be received from the same or different exchanges, depending on the actual implementation. In one embodiment, FIG. 7 shows the receipt of service unit application messages from the registered receive exchange, and FIG. 8 shows the receipt of message handler informational messages on the sending exchange.

Referring to FIG. 7, the registered receive exchange is read by the delivery unit application in step 160. If the message header of a message that was read indicates that the sending process type is the message handler, as determined in step 162, then if the message type in the message header indicates that the message is a start throttling or pipeline down message, as in step 164, then the delivery unit stops sending messages to the service unit application having the process, type, and identifier specified in the message, as in step 166. If the message type is not a start throttling or pipeline down message, then the message is probably a start sending message, and the delivery unit application responds by resuming the message sending process to the associated service unit application, as in step 168. However, if the process type is determined to be non-message handler in step 162, then the message is processed as one originating from the service unit application with the specified process, type, and identifier, in step 170. The process terminates in step 172.

If message handler informational messages are to be received from a different exchange, such as the sending exchange, it is read to receive this type of messages, as in step 180. The process type is checked in step 182 to determine if it is from the message handler. If it is from the message handler, and the message type indicates that it is a re-registration request message in step 184, then the delivery unit application responds by going through the registration process again, as in step 186. The process terminates in step 188.

Referring again to FIG. 3, on the service unit side, service unit applications 70 may register with service element 72 in order to establish an interface for sending and receiving messages to and from the delivery unit in a similar manner. The service unit application is required to maintain the use of process type and process identifiers that are used by the delivery unit applications to achieve consistency. Further, when a service unit application wants to send a message to a delivery unit application, it needs to specify routing to the delivery unit process type and identifier that was established by the delivery unit applications at registration. When a service unit application wants to receive messages from the deliver unit, it needs to have its associated process type and identifier defined by the delivery unit. Details of the service element structure and functionality are described in a U.S. patent application Ser. No. 08/944,682, titled System and Method for Communications and Process Management in a Distributed Telecommunications Switch, filed on Oct. 7, 1997, Attorney Docket 036560.5990, incorporated herein by reference.

In one embodiment, the user datagram protocol/internet protocol is the transport layer protocol for communications between service unit 12 and delivery unit 14. Because it is up to the applications to ensure and guarantee message delivery, a heartbeat mechanism may be instituted. Specialized messages called heartbeats may be transmitted between ethernet link processor pairs and ethernet controller pairs, for example. When a certain period of inactivity associated with a particular pair of ethernet controller pairs is encountered, a heartbeat is sent to the inactive ethernet controller pair. The ethernet controller pair, upon receipt of the heartbeat, sends back a reply to indicate that they are still up and running. Other diagnostic mechanisms may be used if no reply is received from the ethernet controller pair.

Table A below contains some or all of the exemplary delivery unit application information that are needed to send or receive messages to or from the service unit. As delivery unit applications register with the message handler, their associated information are added to this table.

TABLE A

| du_proc_type | du_proc_id |
|---|---|
| mh_send_task_pri | mh_rcv_task_pri |
| enc_incr | |
| udp_exch_name | |
| udp_exch_name | |
| udp_exch_name | |

| | |
|---|---|
| du_proc_type | Delivery unit process type (automatic message & accounting, traffic metering & measurement, information problem reports, etc.). A su_du_hdr.h file contains the defined types. If the required process type is not defined, the header file should be updated with the new type name; |
| du_proc_id | Delivery unit process ID; |
| mh_send_task_pri | Message handler send task priority for this application; default value is decimal 100; |
| mh_rcv_task_pri | Message handler receive task priority for this application; default value is decimal 100; |
| enc_incr | Increment indicator used by message handler for application, set to 1 if the application wants to use the multiple ethernet controller round-robin messaging; |
| udp_exch_name | User datagram protocol exchange name for application. |

Table B below contains the exemplary information associated with service unit applications that are configured to interface with delivery unit applications.

TABLE B

| pipeline | su_device_id |
|---|---|
| su_proc_type | su_proc_id |
| rem_obj_name | |
| rem_obj_name | |
| rem_obj_name | |
| rem_link_id | |

| | |
|---|---|
| pipeline | pipeline local area network identifier (administration or call processing) the service unit application is located on; |
| su_device_id | Service unit device/node ID for the application; |
| su_proc_type | Service unit process type (automatic message & accounting, traffic metering & measurement, information problem reports, etc.); the su_du_hdr.h file contains defined types; |
| su_proc_id | Service unit process identifier; |
| rem_obj_name | user datagram protocol remote object, this name would be defined by the user datagram protocol/internet protocol software support group for their database tables and placed here as an associated reference for this service unit application; |
| rem_link_id | remote logical link identifier. |

There are also tables that the service element applications use in the service unit to validate delivery unit and service unit applications that need to interface with one another. Any time a new delivery unit or service unit application that needs to communicate across the ethernet segments, similar information associated with these applications is added to these tables.

Table C below shows an exemplary structure and content of the message header, which is contained in all messages passed between delivery unit and service unit applications.

TABLE C

| SDI_Su_Device_Id | SPT_Su_Proc_Type |
|---|---|
| SPI_Su_Proc_Id | DUS_DU_Switch_id |
| DPT_Du_Proc_Type | DPI_Du_Proc_Id |
| CT_category_Type | MC_Message_Checksum |
| ENC_id | |
| TS_Time_Stamp | |
| RG\| CV\|   RM   \|   —   \|   SQ_sequence_num | |
| SR_Select_Receive_code | |

| | |
|---|---|
| SDI_Su_Device_Id | Service unit device identifier destined for or originating from; |
| SPT_Su_Proc_Type | Service Unit process type destined for or originating from; |
| SPI_Su_Proc_Id | Service unit process identifier destined for or originating from; |
| DUS_DU_Switch_id | Delivery unit destined for or originating from; |
| DPT_Du_Proc_Type | Delivery unit process type destined for or originating from; |
| DPI_Du_Proc_Id | Delivery unit process identifier destined for or originating from; |
| CT_Category_type | Message type; |
| ENC_id | Identity of the ethernet controller used for message transmission to and from the service unit; |

TABLE C-continued

| | |
|---|---|
| RTS_Registration_Time_Stamp | man-machine interface program registration time stamp; |
| RG_Registration_event | Registration event message flag, indicates whether the message is a registration message; |
| CV_Checksum_Verify | Whether maintenance message checksum verification is required; |
| RM_Route_mode | Optional route mode passed by the service unit applications and used by the message handler; |
| SQ_sequence_num | Message handler maintenance sequence number; |
| SR_Select_Receive_code | Optional message select receive code passed by the service unit applications and used by the message handler. |

As described above, all delivery unit and service unit applications are required to send a registration message to their associated message handler or service element if they want to communicate over the ethernet segments. Table D below shows an exemplary structure and contents of a registration message.

TABLE D

| REG|RP | SEN | TH| PS|REC| | | |
|---|---|---|
| THB_Throttling_High_Buffer | NB_Number_of_Buffers | |
| | TLB_Throttling_Low_Buffer | |
| | MMS_Max_Message_Size | |
| | REN_Receive_Exchange_Name | |
| | REN_Receive_Exchange_Name | |
| | REN_Receive_Exchange_Name | |
| | REI_Receive_Exchange_Id | |
| | RM_Route_Mode | |
| | SR_Select_Receive_code | |
| su_dev_id | su_proc_type | su_pipe_sta |
| su_proc_id | ///////////////////// | |
| — | — | |
| | | |
| su_dev_id | su_proc_type | |
| su_proc_id | ///////////////////// | |

| | |
|---|---|
| REG_REGister_type | Flag for indicating registration type - register or de-register; |
| RP_Register_Pipeline | Flag for indicating registration pipeline selection - administration or call processing; |
| SEN_Send | Flag to request sending of messages - no message, non-resident or resident/dynamic; |
| TH_Throttling | Flag to indicate if throttling monitoring is needed; |
| PS_Pipeline_Status | Flag to indicate if applications need to be informed about pipeline status; |
| REC_Receive | Flag indicating whether can receive incoming msg; |
| NB_Number_of_Buffers | Number of receive message buffers between the applications and the message handler; |
| THB_Throttling_High_Buffer | High water mark for throttling; |
| TLB_Throttling_Low_Buffer | Low water mark for throttling; |
| MMS_Max_Message_Size | Maximum size of service unit message being sent; |
| REN_Receive_Exchange_Name | Exchange name to receive incoming messages; |
| REI_Receive_Exchange_ID | Exchange identifier to receive incoming messages; |
| RM_Route_mode | Route mode for receiving incoming messages; |
| SR_Select_Receive_code | Select/receive code for receiving incoming messages; |

TABLE D-continued

| | |
|---|---|
| su_pipe_sta | 10 Service unit applications that the delivery unit applications want to be informed on pipeline/process outage status; includes device identifier, process type, and process identifier. |

In Table E below, an exemplary structure and contents of a pipeline status message are shown. The pipeline message is sent from the message handler to registered delivery unit applications that have requested pipeline status updates at registration time. The pipeline status message may be appended to the end of the message header containing the service unit application node, type, and identifier that has either gone out of service or has come back in service.

TABLE E

| su_device_id su_proc_id | su_proc_type |
|---|---|
| su_device_id | Service unit device identifier |
| su_proc_type | Service unit process type |
| su_proc_id | Service unit process identifier |

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A communications system in a distributed telecommunications switch having a service unit and at least one delivery unit, comprising:

a plurality of delivery unit network controllers residing in the at least one delivery unit;

at least two service unit network controllers residing in the service unit;

an administration network coupled to a first one of the plurality of delivery unit network controllers and to a first one of the two service unit network controllers, the administration network transporting messages having administration information between the service unit and the at least one delivery unit; and a call processing network coupled to the remaining of the plurality of delivery unit network controllers and to the second one of the two service unit network controllers, the call processing network transporting messages having call processing information between the service unit and the at least one delivery unit, wherein the first one of the plurality of delivery unit network controllers and the first one of the two service unit network controllers are not coupled to the call processing network.

2. A communications system in a distributed telecommunications switch having a service unit and at least one delivery unit, comprising:

a plurality of network controllers residing in the at least one delivery unit;

at least two network controllers residing in the service unit;

an administration network coupled to a first one of the Plurality of delivery unit network controllers and to a first one of the two service unit network controllers, the administration network transporting messages having administration information between the service unit and delivery unit; and a call processing network coupled to the remaining of the plurality of delivery unit network controllers and to the second one of the two service unit network controllers, the call processing network transporting messages having call processing information between the service unit and delivery unit, wherein each of the two service unit network controllers has at least one redundant copy thereof, each of the plurality of delivery unit network controllers has at least one redundant copy thereof, the administration network has at least two segments thereof, and the call processing network has at least two segments thereof.

3. The system, as set forth in claim 2, wherein the administration network comprises first and second independent segments thereof, the first administration network segment being coupled to the first one of the plurality of delivery unit network controllers and to the first one of the two service unit network controllers, and the second administration network segment being coupled to a redundant copy of the first one of the plurality of delivery unit network controllers and to a redundant copy of the first one of the two service unit network controllers.

4. The system, as set forth in claim 2, wherein the call processing network comprises first and second independent segments thereof, the first call processing network segment being coupled to the remaining ones of the plurality of delivery unit network controllers and to the second one of the two service unit network controllers, and the second call processing network segment being coupled to a redundant copy of the remaining ones of the plurality of delivery unit network controllers and to a redundant copy of the second one of the two service unit network controllers.

5. The system, as set forth in claim 2, wherein the service unit comprises:

a plurality of service unit applications executing thereon;

a service element serving as a communications interface between the plurality of service unit applications and the two service unit network controllers.

6. The system, as set forth in claim 2, wherein the at least one delivery unit comprises:

a plurality of delivery unit applications executing thereon;

a message handler serving as a communications interface between the plurality of delivery unit applications and the plurality of delivery unit network controllers.

7. The system, as set forth in claim 2, wherein the at least one delivery unit comprises:

at least one administration delivery unit application executing thereon;

at least one call processing delivery unit application executing thereon;

an administration message handler serving as a communications interface between the at least one administration delivery unit application and the first one of the plurality of delivery unit network controllers; and a call processing message handler serving as a communications interface between the at least one call processing delivery unit application and the remaining ones of the plurality of delivery unit network controllers.

8. The system, as set forth in claim 7, wherein the message having administration information includes a message header specifying a device identifier, process identifier, and process type of the service unit and the at least one administration delivery unit application the administration message is being transported between.

9. The system, as set forth in claim 7, wherein the message having call processing information includes message header identifying a device identifier, process identifier, and process type of the service unit and the at least one call processing delivery unit application the call processing message is being transported between.

10. The system, as set forth in claim 2, further comprising at least four service unit network controllers residing in the service unit, each network controller having a redundant copy thereof, and a first service unit network controller and its redundant copy both being coupled to a first segment of the administration network, a second service unit network controller and its redundant copy both being coupled to a second segment of the administration network, a third service unit network controller and its redundant copy both being coupled to a first segment of the call processing network, and a fourth service unit network controller and its redundant copy both being coupled to a second segment of the call processing network.

11. The system, as set forth in claim 1, further comprising a heartbeat message being sent between the two service unit network controllers and the Plurality of delivery unit network controllers.

12. A communications system in a distributed telecommunications switch having a service unit and at least one delivery unit, comprising:

a plurality of network controllers residing in the at least one delivery unit;

at least two network controllers residing in the service unit;

an administration network coupled to a first one of the plurality of delivery unit network controllers and to a first one of the two service unit network controllers, the administration network transporting messages having administration information between the service unit and delivery unit; and a call processing network coupled to the remaining of the plurality of delivery unit network controllers and to the second one of the two service unit network controllers, the call processing network transporting messages having call processing information between the service unit and delivery unit, wherein the service unit comprises:

a plurality of service unit applications executing thereon;

a service element serving as a communications interface between the plurality of service unit applications and the service unit network controllers;

a registration message built by one of the plurality of service unit applications and sent to the service element for registering desires to communicate with the at least one delivery unit.

13. The system, as set forth in claim 6, further comprising a registration message built by one of the Plurality of delivery unit applications and sent to the message handler for registering desires to communicate with the service unit.

14. The system, as set forth in claim 12, further comprising a delivery unit registration table recording those of the plurality of service unit applications that have registered for communications with the service unit.

15. The system, as set forth in claim 12, wherein the registration message comprises a receive exchange name and a receive exchange identifier.

16. The system, as set forth in claim 12, wherein the registration message comprises a specification for the number of buffers and a maximum message size.

17. The system, as set forth in claim 16, wherein the registration message comprises a request for notification when buffer usage reaches a predetermined high water mark.

18. The system, as set forth in claim 16, wherein the registration message comprises a request for notification when buffer usage reaches a predetermined low water mark.

19. The system, as set forth in claim 12, wherein the registration message comprises a request for notification when a particular one of the plurality of service unit applications in communications with the at least one delivery unit has become inaccessible.

20. A method for communications in a distributed telecommunications switch having a service unit and at least one delivery unit, comprising the steps of:

registering a first delivery unit application residing on a first delivery unit with a first message handler;

registering a service unit application residing on the service unit with a service element;

building a message identifying the service unit application as the destination with a message header by the delivery unit application;

sending the message to the first message handler;

sending the message over an ethernet network and a redundant segment thereof to the service unit;

receiving the message at the service element; and sending the message to the service unit application.

21. The method, as set forth in claim 20, further comprising the step of sending the message between a network controller residing on the delivery unit and a redundant copy thereof and a network controller residing on the service unit and a redundant copy thereof.

22. The method, as set forth in claim 20, further comprising the steps of:

registering a second delivery unit application residing on a second delivery unit with a second message handler;

building a message identifying the first delivery unit application as the destination with a message header by the second delivery unit application;

sending the message to the second message handler;

sending the message over an ethernet network and a redundant segment thereof to the first delivery unit;

receiving the message by the first message handler; and sending the message to the second delivery unit application.

23. The method, as set forth in claim 20, further comprising the steps of:

including in the registration message a request to be notified when the number of buffers used between the first delivery unit application and the service unit application has reached a specified high water mark;

detecting the buffer usage reaching the high water mark;

sending an initiate throttling notification message in response thereto to the first delivery unit application; and stop sending messages to the service unit application in response to receiving the initiate throttling notification message.

24. The method, as set forth in claim 23, further comprising the steps of:

including in the registration message a request to be notified when the number of buffers used between the first delivery unit application and the service unit application has reached a specified low water mark after reaching the high water mark;

detecting the buffer usage reaching the low water mark;

sending a stop throttling notification message in response thereto to the first delivery unit application; and start sending messages to the service unit application in response to receiving the stop throttling notification message.

25. The method, as set forth in claim 20, further comprising the steps of:

including in the registration message a request to be notified when the service unit application becomes inaccessible due to network failure;

detecting the inaccessibility of the service unit application;

sending a pipeline down notification message in response thereto to the first delivery unit application; and stop sending messages to the service unit application in response to receiving the pipeline down notification message.

26. The method, as set forth in claim 25, further comprising the steps of:

detecting the service unit application becoming accessible again;

sending a pipeline up notification message in response thereto to the first delivery unit application; and start sending messages to the service unit application in response to receiving the pipeline up notification message.

* * * * *